Figure 1A:
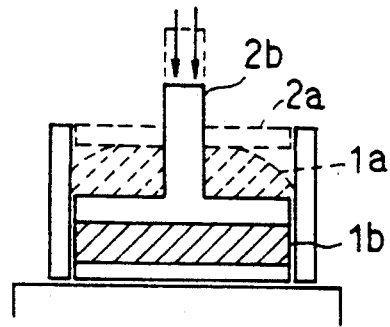

United States Patent [19]

Komatsu et al.

[11] Patent Number: 5,225,233

[45] Date of Patent: Jul. 6, 1993

[54] PROCESS FOR THE PRODUCTION OF FOOD MATERIALS

[75] Inventors: Yoshiki Komatsu, Tama; Kazuhiro Yamaji, Toyonaka, both of Japan

[73] Assignee: Otsuka Foods Co., Ltd., Osaka, Japan

[21] Appl. No.: 942,363

[22] Filed: Sep. 9, 1992

Related U.S. Application Data

[63] Continuation of Ser. No. 695,657, May 6, 1991, abandoned.

[30] Foreign Application Priority Data

May 8, 1990 [JP] Japan .................................. 2-117955

[51] Int. Cl.⁵ .............................. A23J 1/14; A23J 3/22
[52] U.S. Cl. .................................... 426/656; 426/104; 426/468; 426/512; 426/802; 426/412; 426/634; 426/392
[58] Field of Search ............... 426/104, 656, 468, 512, 426/802, 412, 634

[56] References Cited

U.S. PATENT DOCUMENTS

| | | | |
|---|---|---|---|
| 2,813,794 | 11/1957 | Anson | 426/802 |
| 3,488,770 | 1/1970 | Atkinson | 426/802 |
| 4,061,784 | 12/1977 | Youngquist | 426/802 |
| 4,197,323 | 4/1980 | Cerise et al. | 426/104 |
| 4,233,320 | 11/1980 | Monaco et al. | 426/802 |
| 4,540,589 | 9/1985 | Rachi et al. | 426/802 |
| 4,579,749 | 4/1986 | Ishizuka et al. | 426/802 |
| 4,755,393 | 7/1988 | Toba et al. | 426/802 |
| 4,863,749 | 9/1989 | Yamada | 426/802 |
| 4,943,441 | 7/1990 | McCabe | 426/802 |

FOREIGN PATENT DOCUMENTS 0666514  7/1965  Belgium ................. 426/802

*Primary Examiner*—Jeanette Hunter
*Attorney, Agent, or Firm*—Sughrue, Mion, Zinn, Macpeak & Seas

[57] ABSTRACT

The present invention provides a process for preparing a food material, the process comprising the steps of: concurrently dehydrating and shaping a hydrated fibrous material (HFM) by compression which material is prepared from soybean protein; and heating the obtained shaped product in a compressed state.

10 Claims, 3 Drawing Sheets

PROCESS FOR THE PRODUCTION OF FOOD MATERIALS

This is a continuation of application Ser. No. 695,657, filed May 6, 1991, now abandoned.

BACKGROUND OF THE INVENTION

1. Field of the Invention

The present invention relates to a process for producing a novel food material, and more particularly to a process for producing from a soybean protein a mass of food material having a texture resembling that of natural meat.

2. Prior Art

The food industry has endeavored to develop low-fat, low-cholesterol food materials from vegetable proteins as substitutes for various meat products. Since natural meat products are generally considered to be composed of muscular fibers of protein, further efforts have been made to obtain food materials having a fibrous or shred-like texture like that of natural meat. A variety of techniques have been developed for producing such food materials. Among the major techniques is a fiber spinning method which is a modification of methods for making synthetic textile fibers. In this method, an alkaline protein solution is extruded through spinnerettes having numerous minute holes of about 0.1 mm in diameter into an acidic coagulating bath which causes precipitation in a filament form. The filaments are cut to length and assembled into a meat analog by use of binding materials (U.S. Pat. Nos. 2,682,466 and 3,482,998).

A currently predominant technique is a modification of methods for foam molding of synthetic resin, namely an extrusion cooking method in which a protein material, water and other food ingredients are heated at elevated temperatures and pressures and forced out in the atmosphere at ambient temperature and pressure from the extruder (thermoplastic extruder), giving an extrudate which has expanded to form a food material having fibrous structure (U.S. Pat. Nos. 3,488,770 and 3,496,858).

On rehydration, the texturized soybean protein thus prepared is given an appearance and a mouthfeel similar to those of cooked meat pieces, and thus can be used as it is. However, the product has only the size of a thumb at largest.

Methods are also known for producing a larger size mass of meat analogs. In the methods, a texturized soybean protein is hydrated, cohered, set and shaped using as a binder an aqueous solution of protein, starch or the like having an adhesive power or gelation properties. Techniques are also known in which a hydrated texturized soybean protein is crushed into hydrated fibrous fragments and the fragments are admixed with about 5 to about 50% by weight, based on the total amount of the materials used, of a binder composed of a gelable protein or starch and other food ingredients and water, whereby the mixture is gelled, set and shaped into meat analog products like hamburger patties, meat chunks, meat loaves, hams, sausages and so forth (U.S. Pat. Nos. 061,784; 4,376,134; 4,495,205 and 4,863,749).

The food materials obtained by the foregoing methods are not homogeneous and thus similar in mouthfeel to meat products, compared with the food materials theretofore prepared by gelling a uniform mixture of water, a gelable protein and/or starch and other food ingredients. However, these food materials do not afford a sufficient degree of mouthfeel like that of meat products, and lack a texture composed of assembled muscular fibers, namely a texture like that of natural meat products. These food materials also fail to yield a feel (proper cohesiveness and brittleness) due to degree of disintegration of food according to the biting force and fail to involve an enhanced level of chewiness (springiness and masticating level).

It is an object of the present invention to provide a process for producing a mass of food material which has considerable size dimensions, good appearance and texture similar to that of natural meat products.

It is another object of the invention to provide a process for producing a food material useful as an all-vegetable, low-calorie, non-cholesterol material.

Other objects and features of the present invention will become more apparent from the following description.

To achieve the foregoing objects, we conducted extensive research and found that when the hydrated fibrous material obtained from soybean protein is concurrently dehydrated and shaped by compression (i.e. subjected to compression molding) and the shaped product is heated and set in a compressed state, the obtained food material is very similar in any of dimensions, appearance, texture and the like to real meat products.

Our additional discovery is as follows. The foregoing process eliminates a need for the animal or plant protein frequently used as a binder and therefore gives a food material entirely free of the fat ingredient contained in the binder. The source of calories and the source of nutritive ingredients can be limited, e.g., by using seasonings and other ingredients limited to those derived from vegetable sources, and a cholesterol-free food material can be obtained. The present invention has been accomplished based on these novel findings.

According to the present invention, there is provided a process for preparing a food material, the process comprising the steps of: concurrently dehydrating and shaping a hydrated fibrous material (HFM) by compression which material is prepared from a soybean protein; and heating the obtained shaped product in a compressed state.

According to the invention, a food material is prepared from the HFM obtained from a soybean protein. Useful HFM's can be any of those produced by hydrating, swelling and disintegrating the texturized soybean protein (TSP) obtained by the extrusion cooking method, those produced by the fiber spinning method, etc.

Among these HFM's, those obtained from the TSP by the extrusion cooking method are outstanding in mouthfeel and appearance. Discussed below in detail is the method for producing a TSP by the extrusion cooking method.

The TSP is prepared as follows. A mixture of water and soybean proteins as the main ingredient is passed through an extruder at a high temperature and high pressure according to the extrusion cooking method so that the fibers are oriented in a specific direction at a fusing portion of the extruder in the forward end thereof, and a structure with fibers or thin layers oriented in a specific direction is formed in the tissue of TSP. TSP's can be any of those which can be disintegrated into fibrous materials. The water absorbency, fiber properties, flexibility, strength, hardness and other properties of TSP vary with the kind of soybean protein used as the main ingredient, purity of protein, degree of denaturation, amount of protein, kinds and amounts of other protein, starch and the like added when required, amount of water added in the extrusion cooking method, pressurizing and heating conditions in the method, etc. Food materials produced from such TSP have different textures and cooking characteristics.

A preferred soybean protein useful as the main starting material is at least one soybean protein powder selected from the group consisting of soybean flour, defatted soybean flour, concentrated soybean protein powder and isolated soybean protein powder. A suitable soybean protein powder contains at least 50% by weight of soybean protein and has a non-denaturation degree of at least 20, preferably at least 50 in terms of nitrogen solubility index (NSI).

A preferred TSP is one prepared from only the main ingredient, i.e. one or more of the above soybean protein powders. Such TSP can be made into a meat-like protein product free of animal protein. Also, a mixture of soybean protein powder as the main ingredient and an additional ingredient can be used in preparation of TSP. Examples of useful additional ingredients are egg white, milk casein, wheat gluten, proteins derived from plant seeds or the like; starches derived from corn, wheat or like grains or from potatoes, tapioca or the like; etc. The additional ingredient can be used in an amount of not more than 20% by weight, based on the total amount of the main ingredient and the additional ingredient.

The conditions for the extrusion cooking methods are not specifically limited and can be suitably selected from conventional conditions according to the properties of desired TSP.

The TSP having the desired properties can be obtained by adjusting the quantities of starting materials, the conditions for the extrusion cooking method and other factors. Commercially available mass-produced TSP's are also usable.

A TSP suitable for use in the invention has the following characteristics. It has a hydration capacity of about 2 to about 6; it is composed of sufficient fiber tissues; it possesses fibers which, when disintegrated, have a length of at least about 5 mm, preferably about 10 to about 30 mm; and it is in the form of granules, rods, flakes, etc. having a sufficient size to contain such fibers. More specifically, a preferred TSP contains components of at least 10 mm, preferably at least 30 mm, in the entire length as measured along the fibers, in an amount of at least about 75% of the total amount of TSP. The term "hydration capacity" used herein refers to the total amount of water which the TSP is able to hold. The hydration capacity is determined by soaking in excess hot water at 70° C., standing in the water at room temperature for 20 minutes, and draining by further 5 minutes of standing and is calculated by the following equation:

$$hydration\ capacity = (V - V_0)/V_0$$

wherein V is the weight of hydrated TSP, and $V_0$ is the weight of TSP before hydration.

Generally, a particularly suitable TSP is one having a hydration capacity of about 3 to about 6 and prepared from a mixture of isolated soybean protein powder of high protein purity and concentrated soybean protein powder as main ingredients with starch and/or wheat gluten. Such TSP is easy to disintegrate and contains soft, slender fibrous materials. The disintegrated fibrous materials are easy to shape due to the force attributable to intertwining of fibers and can be made into a chicken meat-like food material of relatively high water-content which has a soft texture. The TSP having a hydration capacity of about 2 to about 4 and prepared from defatted soybean protein flour contains fibrous materials which are difficult to disintegrate but proper in chewiness. Such TSP can be formed into a beef-like food material having a strong texture. The food material obtained from a mixture of TSP's having different hydration capacities is irregular in mouthfeel and similar to real meat products, and, for example, gives such mouthfeel as afforded by fatty meat portion.

The TSP is hydrated with hot or warm water to capacity and swollen. The temperature of hot or warm water affects the time required for hydration and swelling and the chewy property of the obtained food material. For example, when the TSP used has a relatively high hydration capacity of about 3 to 6, it becomes hydrated with warm or hot water at about 40 to about 70° C. in about 10 to about 30 minutes, and with hot water at about 70° to about 100° C. in a shorter period. In the latter case, the obtained food material is less chewy than when hydrated with warm or hot water at about 40° to about 70° C. The hydration of TSP having a relatively low hydration capacity of about 2 to about 4 requires about 30 to about 60 minutes when using warm or hot water at about 50° to about 70° C. and a reduced period of about 10 to about 30 minutes when using hot water at about 70° to about 100° C. In the latter case, the obtained food material is less chewy than when hydrated with warm or hot water at about 50° to about 70° C.

A food material having the desired level of chewiness can be obtained by the combination of TSP to be used and a temperature of hot or warm water to be employed for hydration and swelling.

Subsequently the hydrated and swollen TSP is disintegrated by stirring in water. The shape, especially the fiber length, of the hydrated fibrous material obtained by disintegration affects the force by which the fibers are intertwined with one another into a food material, the texture like that of meat, the appearance, etc. Therefore stirring is conducted considering both disintegration and retention of shape. When required, the TSP disintegrated is then washed with fresh water or hot or warm water with stirring to eliminate the undesirable flavor of soybean by replacement therewith. The stirring done for washing as well as for disintegration may achieve an excessive degree of disintegrating effect, which is undesirable because it results in cutting of fibers into shorter pieces.

Stated more specifically, the stirring is effected so that it does not leave the original shape whole of TSP used. A preferred stirring is effected so that ⅓ the whole TSP is reduced to about 1/50 to about 1/10 the original volume, namely to a cross-section area of about 1 to about 50 mm², preferably about 5 to about 25 mm² and a length of about 5 to about 50 mm, preferably about 10 to about 30 mm. Fine particles may be present as mixed with the disintegrated materials.

Stirring methods effective to disintegrate the TSP include those using a stirrer with agitating blades or a pump with an impeller. The methods comprise soaking the TSP in hot or warm water in such amount that the hydrated and swollen TSP can be freely moved therein, more specifically in an amount of about 7 or more times, preferably about 10 to about 30 times, the weight of the TSP before hydration and subjecting the TSP to impact with the agitating blades or impeller to concurrently achieve vigorous agitation or circulation due to the resulting current.

The stirring time is about 2 to about 30 minutes although variable depending on the type of TSP used as the starting material and the conditions for hydration and swelling. Before stirring, the hydrated and swollen TSP may be softened by compressing or beating to such extent as to avoid fracture. The softening can shorten the stirring time.

In the subsequent washing step to be optionally carried out, a stirring device such as one mentioned above can be used. Means other than stirrers, e.g. conventional washing means, may be used in this step since disintegration is not intended therein. During or after disintegration, the undesirable flavor of soybean is released into fresh water or hot or warm water and eliminated by replacement therewith.

The TSP disintegrated and optionally washed is slightly drained to give a HFM. The draining can be easily done with use of a net, mesh or like screening means such as metal net. For industrial purposes, a rice washer is used which is in the form of an inclined rotating steel net drum equipped with a sprinkler. When a rice washer is used, the disintegrated TSP is pumped, together with water, into the apparatus and the TSP rolls down along the inside of the drum during which the TSP is washed and eventually slightly drained, followed by release of HFM.

The water content of HFM thus obtained is not specifically limited, and is in a range such that the mass of HFM can be charged into a mold or a basket for subsequent dehydration by compression or centrifugation. Usually a proper HFM holds a sufficient amount of water to, e.g. a water content of about 75 to about 95% by weight. The reduction into a smaller size mass as by squeezing should be avoided.

The production of HFM by the fiber spinning method is feasible in the conventional manner. The starting soybean protein can be one usually used in conventional fiber spinning methods. The HFM produced by the method may have the same water content and dimensions as that produced by the extrusion cooking method.

The HFM thus obtained is shaped while being dehydrated by compression. A simple method comprises squeezing the HFM as wrapped up with a water-permeable sheet such as a piece of cotton cloth or a net made of Tetoron (trademark for polyester-type synthetic fiber, product of Toyo Rayon K.K.) and rolling the wrapped HFM with a bamboo screen or the like. In industrial applications, a press or a centrifugal dehydrator may be used. Usually in the press, the HFM is placed on the cavity of the mold and is compressed by the upper and lower plates fixed to the inside of mold as with use of hydraulic means, whereby the dehydration and shaping are concurrently accomplished.

To make the HFM having intertwined fibers into a dehydrated void-free shaped product in the above step, a pressure is applied for at least one minute to such extent that the force ultimately exerted on the plates ranges from about 0.5 to about 20 kg weight/cm$^2$, preferably about 2 to about 15 kg weight/cm$^2$. More specifically, for production of a dehydrated shaped product, e.g. about 30 to about 60 mm in thickness, a pressure is gradually raised over a period of about 1 to about 10 minutes.

A desirable shaped product is one having a volume of about ½ to about ¼ that of the HFM placed on the cavity before compression and with a water content of about 60 to about 85% by weight, preferably about 67 to about 80% by weight.

Optionally, a centrifugal dehydrator may be used. For example, in order to produce the same effect as by the press, a vertical batch-type centrifuge is operated by a centrifugal force of about 100 to about 700 G, preferably about 200 to about 500 G, for about 5 to about 30 minutes to achieve dehydration and shaping by compression during which the HFM is pressed against the inner wall of the rotating cylinder to accomplish shaping by compression. When a larger size dehydrated shaped product is produced or when a starting TSP having a high hydration capacity is used, it is desirable to gradually elevate the pressure over an extended time period.

In the above method which simultaneously performs dehydration and shaping, the HFM which is irregularly oriented is oriented only in the centrifugal direction or the pressing direction by the centrifugal force or by the pressing force. When simply compressed with the rolled screen, the HFM is compressed in the centripetal direction and the fiber tissues are oriented in a direction perpendicular to the compressing direction. Such shaped products have fibrous materials not completely but correlatively oriented in one direction so that a cooked product gives a feel due to the orientation of fiber tissues when cut or chewed, and is not incongruous at all. These products are very similar to cooked meat products in texture, appearance, etc.

Figure 1B:
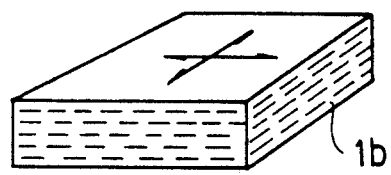
Figure 1C:
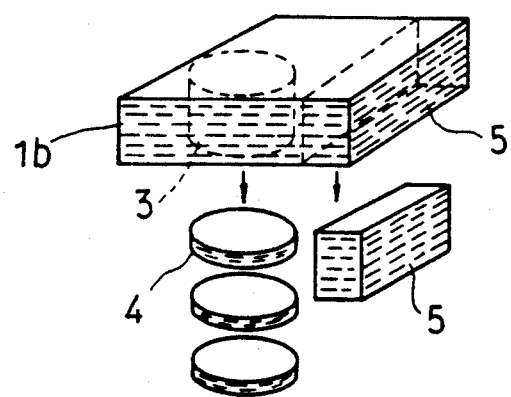
Figure 2A:
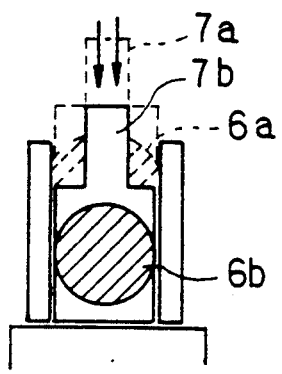
Figure 2B:
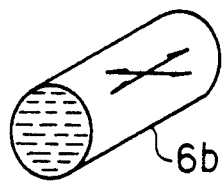
Figure 2C:
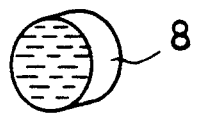
Figure 3A:
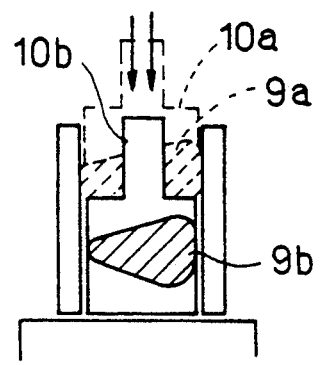
Figure 3B:
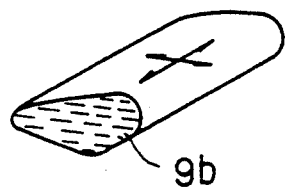
Figure 3C:

The above method using different molds will be described below in greater detail with reference to the accompanying drawings in which:

FIGS. 1A-1C schematically show a press and the HFM before and after compression molding in vertical section, and the obtained plate-shaped products in perspective view;

FIGS. 2A-2C schematically show a press and the HFM before and after compression molding in vertical section, and the obtained cylinder-shaped products in perspective view; and FIGS. 3A-3C schematically show a press and the HFM before and after compression molding in vertical section, and the obtained steak-shaped products in perspective view.

FIGS. 1A-1C show press molding wherein a plate-shaped product is produced. In a FIG. 1A, a HFM to be compressed is indicated at 1a; the dehydrated shaped product obtained by compression is designated 1b; and the positions of a press member before or after compression are designated 2a, 2b. The dehydrated plate-shaped product 1b resulting from compression is also depicted in FIG. 1B in which arrows show the directions of orientation. FIG. 1C illustrates a cylinder-shaped product 3 obtained from the plate-shaped product 1b and having a height corresponding to the thickness of the product 1b, and shows slices 4 cut from the product 3. Also shown in FIG. 1C is a prismatic pillar-shaped product 5 cut from the product 1b.

FIGS. 2A-2C show press molding wherein a cylinder-shaped product is produced. In FIG. 2A, a HFM to be compressed is indicated at 6a; the dehydrated shaped product obtained by compression is designated 6b; and the positions of a press member before or after compression are designated 7a, 7b. The cylinder-shaped product 6b is also indicated in FIG. 2B and a disk 8 of reduced thickness cut from the product 6b is illustrated FIG. 2C.

FIGS. 3A–3C show press molding wherein a steak-shaped product is produced. In FIG. 3A, indicated at 9a is a HFM before compression; at 9b, a dehydrated steak-shaped compression; and at 10b, the position of the press member after compression. FIG. 3B is a perspective view of the steak-shaped product 9b and FIG. 3C is a perspective view of a portion 11 cut from the product 9b.

The mass dehydrated and shaped by compression is held integral, to all appearances, due to the force of intertwining fibers but may be easily disintegrated due to an external force.

The shaped product is heated in compressed state to prevent the expansion and disintegration during heating. The heat treatment can set the dehydrated mass without use of a binder into a shaped product which is not easily disintegrated. The heating in a compressed state can be conducted while maintaining the compressed state in compression molding. Alternatively, the shaped product released from the mold may be heated after it has been securely wrapped with a plastics film or a piece of cloth or vacuum-packaged with a plastics film, preferably followed by being held in a retainer. In that case, the expansion of wrapped or packaged product due to heating is prevented by the plastics film, cloth piece or the retainer, whereby the product is made into compressed state.

The compressing effect can be obtained by, instead of holding the shaped product in a retainer, vacuum-packaging the product with a retort pouch film and heating the packaged product in a retort under an elevated pressure. The pressurizing conditions in the retort can be determined usually according to the heating temperature. Generally the elevated pressure is in the range of about 0.5 to about 3.5 kg weight/cm$^2$ and are suitably adjusted in this range.

The heating step is usually conducted over a time period and at a temperature both sufficient to heat at least the core of the shaped product to about 80° C. or higher so that sterilization is simultaneously achieved. Usually the heating temperature is in the range of about 80° to about 135° C. The heating time, although variable with the dimensions, particularly the thickness, of the shaped product, is in the range of about 90 to about 120 minutes in heating the shaped product of about 50 mm thickness at about 80° C., or about 30 to about 60 minutes in heating the same at about 120°. When the shaped product has a great thickness, an extended time period may be required for transfer of heat. Therefore, heating at a high temperature is undesirable because it may cause a significant difference in heat history between the core and the surrounding portion of the shaped product of great thickness, thereby reducing the stability of quality.

The shaped product is then cooled to room temperature or lower at which the product becomes stably firm, preferably to 0° to about 10° C. The shaped product in this state, which is fully set, can be provided for refrigeration or for cooking as wrapped or packaged or as cut to a suitable size or to a desired shape after its removal from the retainer.

According to the invention, the level of chewiness (springiness and masticating degree) of the obtained food material can be adjusted by varying the kind of soybean protein used, the hydrating and swelling conditions of HFM, the content of remaining water, the heating conditions, etc. The cohesiveness and brittleness of the obtained material can be controlled by selecting the degree of disintegration, length and orientation of fibrous materials, extent of compression, molding method, degrees of heating and setting, etc. When desired, the disintegrated fibrous materials may be frozen, thawed and shaped concurrently with dehydration under compression, whereby a more chewy food material can be obtained.

Because the food material produced in the invention has an oriented structure, the cutting method and the cutting direction of the food material affects the level of chewiness (springiness and masticating degree) and the appearance. Therefore, when the food material is cut by a proper method, a cooked product is improved more than ever in cutting effect, chewing feel, disintegrating feel, etc.

Given below are specific examples of variously cut food materials. When the food material is cut to a thickness of about 15 mm in a direction vertical to the oriented fibers in the material and slightly destroyed by trimming, carving, tendering or otherwise according to the preference, the obtained cooked food material is more closely similar in texture to real steak. When the food material is sliced to a thickness of about 2 mm in a direction in parallel with the oriented fibers and is used for preparing a boiled dish, the food material is slightly disintegrated due to boiling and tastes closely like cooked sliced meat. The food material may be cut obliquely, square or otherwise according to real meat products to be simulated, or may be torn off into chunks instead of cutting. The food material may be lightly smashed to improve the appearance and to diffuse the flavor, whereby the food material is rendered extremely similar to real meat products in mouthfeel, degree of mastication and appearance.

For cooking, the food material is cut as described above to a desired size and pre-treated as commonly done in cooking, as by sprinkling salt, pepper and seasoning, by dipping the food material into a concentrated seasoning or sauce for impregnation or by boiling for flavoring.

A mode of flavoring and the kind of materials to be used are selected according to preference and nutrition merit. The food material can be flavored by adding a seasoning and the like in the manufacturing process of the food material. In this case, the water-soluble seasoning or the like may be partly released into the water removed by dehydration. To prevent the release, the seasoning may be made into a water-insoluble solid such as microcapsules, jelly or the like before mixing with the food material, or a seasoning, or fat and oil in liquid state may be injected into the food material by a syringe and/or may be used to coat the food material, followed by heating.

Various plant food materials can be added to the food material before dehydration and shaping. Examples of useful plant food materials are long thin strips of carrot, radish (dried one), onion and like vegetables, seaweeds, seeds, nuts, etc. A small quantity of animal food materials, and materials conventionally used as a binder may be added to the food material produced in the invention to bring about the desired flavor, contemplated taste, intended nutrition level and the like.

According to the present invention, a large mass of food material resembling natural meat in the texture can be produced from a soybean protein without use of a binder. In other words, the present invention provides a food material very useful for an all-vegetable, low-calorie, non-cholesterol meal which is drawing attention these days.

The food material obtained in the invention contains oriented fiber tissues and has a texture, appearance and other characteristics which are variable by cutting the food material in a selected direction by a selected method. The food materials of the invention can be used in preparing various meat dishes by cutting the food material to various sizes, for example, to a large size as in cooking a steak or a cutlet, to a medium size as in making a hamburger patty, a fillet or the like, to a small size as in cooking a curried food, stew or other boiled foods, and to small pieces or thin slices as in preparing a curried dish or frying. The food materials produced in the invention can be also used in cooking foods by heating at high temperatures including canned foods, retort pouch foods and so on.

EXAMPLES

The present invention will be described below in greater detail with reference to the following Examples.

The term "disintegrator" used in the Examples refers to a stirring apparatus used to disintegrate a TSP. The disintegrator comprises a cylinder-shaped tank 30 cm in diameter and 35 cm in height in which a stirring axle is set. The stirring axle has one to three inverted triangle-shaped blades of 25 cm in length with each side 1 cm in cross section and is adapted to make reciprocal rotational motion at an angle of 90°. The disintegrator was operated at a rate of 400 r.p.m. The term "pump-type disintegrator" is a circulation system used to disintegrate a TSP. The pump-type disintegrator has a 200-l vol. container which is equipped with a vertical sand pump capable of rotating an impeller of 20 cm in diameter in a casing of 30 cm in diameter. The system is adapted to circulate the contents of the container through the pump.

EXAMPLE 1

A 500 g quantity of commercially available TSP (a colorless cylinder-shaped product having a protein content of 68% by weight in terms of anhydride weight and measuring about 15 to about 20 mm in diameter and about 30 to about 60 mm in length) having a hydration capacity of 4 was hydrated and swollen by soaking in 8 kg of hot water at 60° C. for 20 minutes and drained. The TSP was charged, together with 15 kg of water, into a disintegrator which was then operated for 3 minutes. The TSP was twice stirred and washed with water in another container equipped with a stirrer and drained by a basket, giving about 2,500 g of a hydrated fibrous material (HFM) having a water content of 85% by weight and containing numerous fiber bundles with a cross-section area of about 5 to about 20 mm$^2$ and a length of about 15 to about 35 mm. The HFM was wrapped up with a cotton cloth piece and a pressure was gradually applied with a hydraulic press under a final load of 880 kg, i.e. 1.8 kg weight/cm$^2$, to achieve dehydration and shaping, giving 1,550 g of a dehydrated shaped product having a water content of 76% by weight (measuring 25 cm in diameter and 3.3 cm in thickness). The product was vacuum-packaged in a plastics pouch, smothered at 100° C. for 90 minutes and cooled in a refrigerator to give a lump of slightly soft, springy, white, tasteless food material.

The food material thus obtained was tested for properties and the results were compared with those of a smothered chicken breast block. Table 1 below shows the results.

A small lump of food material measuring 3 cm (width)×3 cm (length)×1.5 cm (thickness) was tested with use of a rheometer to evaluate a compressed elastic stress (kg) in the direction of thickness (under a load of 10 kg by a disk of 1 cm in diameter pushed into the lump at a rate of 6 cm/min), a shearing stress (kg) as measured with a blade having a V-shaped edge (under a load of 10 kg by a blade with a width of 2 cm and a V-shaped edge inclined at an angle of 45 degrees while the blade is pushed into the lump at a rate of 6 cm/min), and brittleness (kg) when disintegrated (instantaneous reduction of stress (kg) by disintegration in measuring the compressed elastic stress).

TABLE 1

| | Compressed elastic stress (kg) | | **Shearing stress (kg) | | Brittleness (kg) | |
|---|---|---|---|---|---|---|
| | Fiber direction | *Direction vertical thereto | Fiber direction | Direction vertical thereto | Fiber direction | Direction vertical thereto |
| Food material | 2.85 | 3.33 | 1.68 | 2.62 | 1.12 | 1.05 |
| Cooked chicken meat | 3.10 | 3.28 | 2.20 | 2.55 | 1.20 | 0.80 |

Note:
*Direction vertical thereto = Direction vertical to fiber direction
**Shearing stress = Shearing stress (with a blade of V-shaped edge)

The results of Table 1 show that the food material prepared above had a texture composed of fiber tissues oriented in the specific direction, and was different in any of compressed elastic stress, shearing stress and brittleness between the measurements thereof obtained in the fiber direction and those in the direction vertical thereto. The food material was similar in the results to cooked chicken breast used for comparison.

The food material obtained above was cut obliquely at an angle of 30° to a thickness of 15 mm, and 140 g of the cut product was seasoned with an aqueous solution of 2.8 g of a hydrolyzed plant protein and 0.7 g of chicken flavor, and sautéed in the same manner as in sautéing a steak, and an orange sauce was sprinkled over the sautéed food. Ten panelists were served with the cooked dish and assessed the appearance and mouthfeel of cooked food. The evaluations are indicated below in the form of questionnaire (individual panelists were permitted to consent to more than one item in the questionnaire).

1. The cooked food had such fibrous texture that the food was elastic and quickly disintegrated when a knife was introduced into the food and the food was chewed.

The cooked food closely resembled natural meat, and thus was desirable (6 panelists).

2. The cooked food was less chewy and was similar in mouthfeel to chicken breast steak, hence desirable (5 panelists).

3. The cooked food was slightly soft and tasted like a soft-type boiled fish paste blended with yam for foaming (2 panelists).

The foregoing results demonstrate that the obtained food material was very similar to chicken breast steak in mouthfeel and appearance.

EXAMPLE 2

A 1,600 g quantity of commercially available TSP (a flat, brown product having a protein content of 52% by weight in terms of anhydride weight and measuring about 15 mm in width and about 20 to about 50 mm in length) having a hydration capacity of 3 was charged into a disintegrator together with 16 kg of hot water at 85° C. and was hydrated and swollen for 20 minutes. Then the disintegrator was operated for 15 minutes. The TSP was brought into a mesh bag made of Tetoron (trademark for polyester-type synthetic fiber, product of Toyo Rayon K.K.) and lightly squeezed with hands for dehydration. The TSP was returned to the disintegrator and mixed with water, and the disintegrator was operated for 1 minute. In this way, the TSP was washed with water twice, giving about 4,500 g of HFM which had a water content of 80% by weight and contained numerous fiber bundles with a cross-section area of about 5 to about 20 mm$^2$ and a length of about 10 to about 20 mm. A 1,100 g portion of the HFM was wrapped up with a cotton cloth piece to provide a cylinder-shaped mass which was firmly rolled with a bamboo screen and fastened with a cord while being squeezed The mass was smothered in this form at 100° C. for 90 minutes and cooled, whereby 850 g of a fully set cylinder-shaped food material A (8 cm in diameter, 18 cm in length, a water content of 74% by weight) was obtained.

The food material A was tested for properties. The results are shown below in Table 2. For comparison, a beef fillet was sautéed with oil (referred to as "cooked beef meat product (a)) and a beef round was boiled with soup (referred to as cooked beef meat product (b)). The cooked beef meat products (a), (b) were tested in the same manner for properties with the results shown in Table 2.

the direction vertical thereto. The food material A was similar in the results to the cooked beef products (a), (b).

A 150 g portion of the food material A was cut to a thickness of 1.5 cm in the fiber direction, namely cut in round slices and lightly beaten. The slices were put on a frying pan along with an aqueous solution of 10 g of beef extract paste, 1.5 g of hydrolyzed plant protein and 0.5 g of a beef flavor and were boiled and flavored until the water was substantially completely removed. The boiled food was sautéed in the same manner as in sautéing a steak to give a steak-like dish.

A 100 g portion of the food material A was cut to a thickness of 1 cm in the fiber direction, namely cut into two round slices. The two slices were boiled and flavored with an aqueous solution of 5 g of a beef extract paste and 2 g of hydrolyzed plant protein on a frying pan until the water was substantially completely removed. The slices were covered with bread crumbs and fried with oil to give a cutlet-like food.

The food material A was cut square into cubes 1 to 2 cm in each side and the cubes were deformed by slight compression. A 60 g portion of the deformed cubes was soaked in 100 g of a commercially available concentrated tomato sauce diluted 2-fold with water. To the sauce was added 5 g of a beef extract paste. The mixture was boiled to give a tomato sauce-flavored dish.

A portion of the food material A was cut to a thickness of 1.4 cm in the fiber direction, namely cut into round slices and disks of 5.5 cm in diameter were cut off from the slices. The three disks (about 80 g) and 50 g of precooked concentrated vegetable soup were placed into a can and heated in retort to produce a canned food.

The cooked products were tested for properties. The results are described later.

EXAMPLE 3

A portion of the HFM obtained in Example 2 was charged into three different molds under the conditions as shown below in Table 3, and dehydrated and press-molded by a hydraulic press. The shaped product was placed into a vinylidene chloride casing, vacuum-packaged, brought into a retainer of stainless steel and heated. In this way, three kinds of food materials B to D were prepared. The food materials B to D were cooked into the same kinds of cooked products as indicated above in Example 2. The cooked products were tested to evaluate the properties. The results are described later.

TABLE 2

|  | Compressed elastic stress (kg) | | **Shearing stress (kg) | | Brittleness (kg) | |
|---|---|---|---|---|---|---|
|  | Fiber direction | *Direction vertical thereto | Fiber direction | Direction vertical thereto | Fiber direction | Direction vertical thereto |
| Food material A | 3.15 | 4.20 | 2.02 | 2.95 | 1.48 | 1.15 |
| Cooked beef product (a) | 3.20 | 4.17 | 2.20 | 2.90 | 0.95 | 1.05 |
| Cooked beef product (b) | 3.20 | 3.50 | 2.20 | 2.55 | 1.20 | 0.82 |

Note:
*Direction vertical thereto = Direction vertical to fiber direction
**Shearing stress = Shearing stress (with a blade of V-shaped edge)

The results of Table 2 show that the food material A had fiber tissues oriented in the specific direction, and was significantly different in each of compressed elastic stress, shearing stress and brittleness between the measurements obtained in the fiber direction and those in

EXAMPLE 4

A 6 kg quantity of hot water (90° C.) was added to 1,000 g of a TSP (same as used in Example 2) having a hydration capacity of 3, and the TSP was hydrated and swollen for 20 minutes and drained. The drained product was charged, together with 15 kg of water, into a disintegrator which was then operated for 10 minutes. The product was twice washed with water in the same manner as in Example 2 and slightly dehydrated in a mesh bag of Tetoron into a mass with a water content of about 80% by weight. A portion of the mass was mixed with the additives and other materials as listed below in Table 4. The mixture was thoroughly stirred and charged into a mold under the conditions given in Table 3, and dehydrated and press-molded by a hydraulic press. The shaped product was heated in the same manner as in Example 3. In this way, three kinds of food materials E to G were prepared.

The food materials E to G were cooked into dishes as stated above. The cooked materials E to G were found suitable for cooking steak-like and cutlet-like foods (although not suited for soup and boiled food) and excellent in the mouthfeel, degree of mastication and appearance as in Example 2, hence desirable. The results are described later.

Food material (D): The dish had sufficient chewiness and springiness, and was unlikely to easily crumble. It tasted like veal steak.

Food material (E): The dish had significant springiness and hardness and tasted like roasted beef tongue.

The food material (F): While the vegetable components were inhomogeneous and tended to disintegrate, the dish was proper in chewiness.

The food material (G): While the seaweed components tended to disintegrate, the dish was sufficient in chewy property.

(2) Cutlet-like Dish (Covered With Bread Crumbs and Fried)

Food material (A): The dish had sufficient chewiness, and tended to slightly crumble.

Food material (B): The dish had sufficient chewiness and tasted like beef cutlet.

Food material (C): The dish was less chewy and tended to crumble. It tasted like a chicken cutlet.

Food material (D): Not cooked

Food material (E): The dish had too much springiness

TABLE 3

| | (Unit) | Experiment No. | | | | | |
|---|---|---|---|---|---|---|---|
| | | 1 | 2 | 3 | 4 | 5 | 6 |
| Quantity of HFM | (g) | 800 | 800 | 800 | 750 | 750 | 750 |
| Type of mold | — | FIG. 1 | FIG. 2 | FIG. 3 | FIG. 1 | FIG. 1 | FIG. 1 |
| Applied pressure | (kg/cm$^2$) | 15 | 15 | 12 | 12 | 12 | 12 |
| Quantity of shaped product | (g) | 560 | 650 | 600 | 480 | 615 | 700 |
| Water content in shaped product | (wt. %) | 70.4 | 74.0 | 72.5 | 67.4 | 70.5 | 72.5 |
| Dimensions of shaped product | (cm) | 15 × 11 × 3.3 | 8.2φ* × 12 | 6/4 × 12 × 12 | 15 × 11 × 2.8 | 15 × 11 × 3.6 | 15 × 11 × 4.1 |
| Heating temperature | (°C.) | 80 | 100 | 100 | 80 | 90 | 100 |
| Smothering (boiling) time | (min) | 120 | 90 | 90 | 120 | 120 | 120 |
| Food material (product) | — | B | C | D | E | F | G |

Note:
φ = diameter

TABLE 4

| | Experiment No. | | | | | |
|---|---|---|---|---|---|---|
| | 4 | | 5 | | 6 | |
| Additive (or other materials) | Hydrolyzed plant protein (natural seasoning) | 20 g | Long thin strips of carrot | 100 g | Brown algae | |
| | Powdered soybean paste (miso powder) | 10 g | Dried strips of radish | 60 g | (hydrated) | 75 g |
| | | | Hydrolyzed plant protein (natural seasoning) | 15 g | (dried) | 25 g |
| | | | | | Cut wakame seaweed | |
| | | | | | (hydrated) | 180 g |
| | | | Powdered soybean paste | 10 g | (dried) | 20 g |
| | | | | | Hydrolyzed plant protein (natural seasoning) | 10 g |
| | | | | | Powdered soybean paste | 5 g |
| Food material (product) | E | | F | | G | |

(1) Steak-like Dish (Sautéed With Oil)

Food material (A): The dish had sufficient chewiness, and tended to slightly crumble like real beef steak when a knife was introduced into the food.

Food material (B): The dish had sufficient chewiness and showed the tendency to slightly crumble.

Food material (C): The dish was satisfactory in chewy property and was apt to crumble.

and hardness and was less adequate.

The food material (F): Although less springy, the dish had sufficient chewiness and tended to crumble.

The food material (G): Although less springy, the dish had sufficient chewiness, and was suitable as a fry although easily disintegrated.

(3) Tomato-sauce Flavored Dish (Boiled Food)

Food material (A): The dish was less springy but had sufficient chewiness. It tasted like boiled beef round.

Food material (B): The dish had too much springiness and sufficient chewiness.

Food material (C): The dish tended to disintegrate and was less chewy. It tasted like a well boiled beef stew.

Food material (D): The dish was properly disintegrated due to boiling and had sufficient chewiness and suited springiness, hence desirable.

(4) Canned Boiled-in-water Food (Vegetable Soup)

Food material (A): The dish was less springy and sufficient in chewiness, and easily disintegrated.

Food material (B): The dish had sufficient chewiness and tasted like boiled fish paste.

Food material (C): The dish had a feature of easily disintegrating and was satisfactory in chewy property.

EXAMPLE 5

A 4 kg quantity of commercially available TSP (a flat brown product which had a protein content of 54% by weight in terms of anhydride weight and was about 13 mm in width and about 15 to about 40 mm in length) having a hydration capacity of 2.8 was hydrated and swollen by soaking in 36 kg hot water at 85° C. for 30 minutes and withdrawn with use of a basket. The TSP was charged into a pump-type disintegrator together with 100 kg of warm water at 50° C. and then the disintegrator was operated for 20 minutes. The TSP and water were charged, by the pump of the disintegrator, into a wire net cylinder-type rice washer of the type capable of rotating, drained, returned to the disintegrator, and admixed with water. The disintegrator was operated again for 5 minutes. Thereafter the mixture was drained, giving about 17 kg of a HFM which had a water content of 87% by weight and contained numerous fiber bundles with a cross-section area of about 5 to about 20 mm$^2$ and a length of about 10 to about 20 mm. A 7 kg portion of the HFM was placed onto a square mold, 30 cm in each side, covered with a cotton cloth piece, and a pressure was gradually applied over a period of 5 minutes with upper and lower plates attached to the inside of the mold under a final load of 5500 kg, namely 6 kg weight/cm$^2$ of the upper plate to achieve dehydration and shaping, whereby about 3.5 kg of dehydrated shaped product was obtained. The shaped product was charged into a heat-resistant plastics bag, and packaged and sealed in the bag in a degree of vacuum of at least 740 mmHg. The packaged product was heated at 115° C. at a pressure of 1.5 kg/cm$^2$ in a retort and cooled, giving 4.3 kg of fully set food material in the form of a square plate (27 cm in width and length, 4.8 cm in thickness, a water content of 74% by weight). The square plate was cooked into the same four kinds of cooked products as described in Example 2. The cooked foods were tested to evaluate the properties. The cooked foods were excellent in mouthfeel, degree of mastication and appearance, namely showed the same good results as in Example 2.

While the invention has been described in detail and with reference to specific embodiments thereof, it will be apparent to one skilled in the art that various changes and modifications can be made therein without departing from the spirit and scope thereof.

We claim:

1. A process for preparing a food material which does not contain a binder, the process consisting essentially of the steps of:

concurrently dehydrating and shaping, in the absence of a binder, a hydrated fibrous material (HFM) from soybean protein by compression to obtain a shaped product; and heating the shaped product while in a compressed state and in the absence of a binder, wherein the HFM is prepared by extrusion cooking water and a soybean protein powder containing at least 50% by weight of said soybean protein to produce a texturized soybean protein (TSP) and hydrating, swelling and disintegrating the TSP.

2. A process according to claim 1 wherein the TSP has a hydration capacity of about 2 to about 6.

3. A process according to claim 1 or 2 wherein the HFM has a water content of about 75 to about 95% by weight.

4. A process according to claim 1 wherein the disintegrating comprises stirring the hydrated and swollen TSP in water using a stirring apparatus or a pump having an impeller while retaining the length of the fibers.

5. A process according to claim 4 wherein the stirring apparatus used for the disintegrating is one having an inverted triangle-shaped blade in cross-section and adapted to make reciprocal rotational motion at an angle of 90°.

6. A process according to claim 1 wherein the step of concurrently dehydrating and shaping is by compression molding in a press to give a shaped product having a water content of about 60 to about 85% by weight.

7. A process according to claim 6 wherein a pressure in the range of about 0.5 to about 20 kg weight/cm$^2$ is applied to the surface of the HFM being compressed during the compression molding.

8. A process according to claim 6 wherein the direction of compression during the compression molding is limited so that a shaped product is given a texture composed of fiber tissues oriented in a direction vertical to the compression direction.

9. A process according to claim 1 wherein the heating is conducted at about 80° to about 135° C.

10. A process according to claim 1 or 9 wherein the heating comprises vacuum-packaging and heating in a retort.

* * * * *